United States Patent [19]

Ganong, III et al.

[11] Patent Number: 5,136,654

[45] Date of Patent: Aug. 4, 1992

[54] VOCABULARY PARTITIONED SPEECH RECOGNITION APPARATUS

[75] Inventors: William F. Ganong, III, Brookline; William F. Bauer, Belmont; Daniel Sevush, Hopkinton; Harley M. Rosnow, Cambridge, all of Mass.

[73] Assignee: Kurzweil Applied Intelligence, Inc., Waltham, Mass.

[21] Appl. No.: 424,139

[22] Filed: Oct. 19, 1989

[51] Int. Cl.[5] .............................................. G10L 5/00
[52] U.S. Cl. ......................................... 381/41; 381/43
[58] Field of Search ................................... 381/41–45; 364/513.5

[56] References Cited

U.S. PATENT DOCUMENTS

| | | | |
|---|---|---|---|
| 4,181,821 | 1/1980 | Pirz et al. | 381/43 |
| 4,601,054 | 7/1986 | Watari et al. | 381/43 |
| 4,715,004 | 12/1987 | Kabasawa et al. | 381/43 |
| 4,797,929 | 1/1989 | Gerson et al. | 381/43 |
| 4,799,262 | 1/1989 | Feldman et al. | 381/43 |
| 4,802,224 | 1/1989 | Shiraki et al. | 381/41 |
| 4,837,831 | 6/1989 | Gillick et al. | 381/42 |

Primary Examiner—Dale M. Shaw
Assistant Examiner—Michelle Doerrler
Attorney, Agent, or Firm—Henry D. Pahl, Jr.

[57] ABSTRACT

The speech recognition system disclosed herein operates to select, from a collection of tokens which represent vocabulary words, those tokens which most closely match an unknown spoken word. The collection of tokens is divided into partitions, each of which is characterized or identified by a representative one of the tokens. Both the tokens and the unknown speech word are represented by a sequence of standard data frames which may, for example, define characteristic spectra. In operation, the system computes the distance from the unknown to each of the representative tokens and then, starting with the partition having the nearest representative token and proceeding through partitions represented by successively more distant tokens, examines the other tokens in that partition while keeping a list of predetermined length identifying the examined tokens which thus far provide the best match. This process is continued until the number of distance calculations performed reaches a preselected level.

14 Claims, 5 Drawing Sheets

VOCABULARY PARTITIONED SPEECH RECOGNITION APPARATUS

BACKGROUND OF THE INVENTION

The present invention relates to machine recognition of spoken words and more particularly to a method of organizing vocabulary tokens so as to facilitate the finding of tokens which most closely match an unknown spoken word.

As is understood by those skilled in the art, the difficulty with which a spoken word can be recognized increases dramatically as the number of possible words to be recognized increases, i.e., as the vocabulary grows. Whether speech samples are represented by a succession of spectra or by other forms of data encoding, the calculation of the degree of match or vector distance separating two words is computationally intensive. It is therefore important to reduce the number of such computations which must be performed in order to identify an unknown with a reasonable degree of accuracy. This problem is further complicated by the fact that the data points or frames will typically not be distributed at all uniformly over the possible data space.

Among the several objects of the present invention may be noted the provision of a novel speech recognition system; the provision of such a system which provides a high degree of accuracy in word recognition; the provision of such a system which operates quickly; the provision of such a system which is highly reliable; the provision of such a system which is of relatively simple and inexpensive construction. Other objects and features are in part apparent and in part pointed out hereinafter.

SUMMARY OF THE INVENTION

In accordance with one aspect of the present invention, the collection of data tokens which represent vocabulary words are partitioned into groups and each partition is identified or characterized by a representative one of the tokens within the partition. In considering a new unknown, the system computes the distance between the unknown and each representative and then, for each successively more distant representative, computes the vector distance between the unknown and all the other tokens within the respective partition until the number of distance computations reaches a preselected level.

In accordance with another aspect of the invention, a collection of data tokens is partitioned by determining, for each token in sequence, if the token being examined matches any previously identified representative within a preselected tolerance and, if it does not, identifying the token being examined as a new representative.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
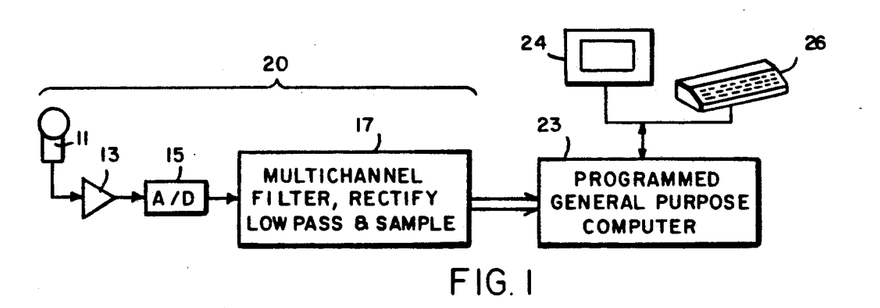
FIG. 1 is a block diagram of the electronic components employed in one embodiment of the speech recognition system of the present invention.

In common with many prior art systems, the apparatus of the present invention operates by first transducing acoustic speech waveform to obtain corresponding electrical signals and then digitizes that signal. With reference to FIG. 1, the transducer there indicated is a microphone 11 which is connected, through a suitable preamplifier 13, to an analog-to-digital converter 15. As is also usual in the art, the speech signal is treated to obtain, at a succession of sample times, a sequence of digital values which characterize the speech. In the embodiment illustrated, these values are obtained by passing the speech signal through a digital filter bank and then rectifying, low pass filtering, and sampling the outputs of the various channels to obtain values representing the energy within the corresponding passband. The collection of digital values defining the spectrum at a given moment of time is referred to hereinafter as a frame.

In FIG. 1, the filtering, rectifying, low pass filtering and sampling circuitry is indicated generally by reference character 17. The digital filter bank, rectifyer and sampling system 17 may, for example, be efficiently implemented using commercially available digital signal processing integrated circuits. Preferably, one of the passbands encompass the entire effective speech spectrum so as to provide a channel useful in identifying the beginning and ends of words although, in other embodiments, some or all of the passbands may be used for this purpose.

As thus far described, the front end portion of the system is essentially similar to that described in coassigned U.S. Pat. No. 4,799,262 issued Jan. 17, 1989 to Joel A. Feldman, Wm. F. Ganong III, and Scott Bradner, and entitled "Speech Recognition." The disclosure of that patent is incorporated herein by reference.

Collectively, the front end circuitry is identified by reference character 20. Though the multichannel filter bank is illustrated as being implemented digitally, it should be understood that analog filtering followed by analog-to-digital conversion might also be used. Likewise, while multichannel filtering is presently preferred, it should be understood that other methods of treating or encoding the raw input signal might also be employed, for example, linear predictive encoding which might also be done by special purpose hardware.

A general purpose microcomputer system 23, e.g. one employing a Intel 80386 microprocessor, is provided for general system management and control functions, as well as for processing of the distance calculations. As is conventional, computer 23 incorporates a video display 24 and a keyboard 26 for providing interaction with the system user.

As indicated previously, the front end circuitry 20 is operative to provide, at each of a succession of sample times, a "frame" of digital data which characterizes the speech. The present invention contemplates that the user will establish a list of standard frames which will be useful in differentiating different speech sounds appearing in the vocabulary required by the user. As will be understood by those skilled in the art, the content of each standard frame will depend, not only upon the particular method of encoding, i.e. multichannel filtering or linear predictive encoding, but also upon the requirements of the user's application and the vocabulary which it is desired to recognize. Typically, the list of standard frames will be based upon actual samples of the speaker whose voice is to be recognized. In other words, the list of standard frames will be generated as a result of a training session in which the speaker is asked to repeatedly voice phrases including the type of information which the system is to recognize and, from the data thereby accumulated, a representative list of characteristic frames is generated. Alternatively, the standard frames can be precalculated from a knowledge or database drawn from a large number of speakers.

While each frame may be considered to be a mutidimensional vector as understood by those skilled in the art, each of the standard frames is preferably represented by an encoded index to reduce the amount of data which must be stored and manipulated in the subsequent processes performed by the apparatus of the present invention. This is known as vector quantization by those skilled in the art As is also understood by those skilled in the art, it is often necessary that electronic systems which are to recognize a large vocabulary be trained by gathering a collection of data tokens from those persons whose speech is to be recognized. In the embodiment described herein, the computer 23 runs a program in which the subject speakers are presented, through the video display, with a series of words which are to be spoken into the microphone. For each such word spoken, a sequence of data frames or spectra are generated and these sequences are stored by the computer.

Rather than utilizing the raw data frames or spectra generated by the front end components, the computer preferably calculates the distance between each of the incoming data frames and each of a pre-established collection of standard frames and then substitutes for the raw data frame the closest matching standard frame. Thus, prior to any attempt at partitioning of the data or any word recognition, each vocabulary specimen is converted to a sequence of standard frames. This procedure is also used in the apparatus of U.S. Pat. No. 4,799,262 referenced previously.

Each sequence of standard frames which is so entered into the data base for recognition is referred to herein as a token. To increase reliability of recognition, it is also preferred that multiple samples o tokens be established for each word which is to be included in the recognition vocabulary. The number of tokens included for each word may vary depending upon the difficulty which the word is known to present and the criticality of the word being recognized in the particular user application.

A major advantage of utilizing sequences of standard frames to represent data tokens is that the complexity of subsequent calculations may be substantially reduced by having the computer generate, prior to any recognition or data partitioning activities, a precomputed table of the distances between each standard frame and each other standard data frame. Thus, during the calculation of distances between tokens and between an unknown and any token, the computer does not have to calculate each of the distances between the corresponding frames but, rather, may obtain those values by simply doing a table lookup into the table of precalculated values.

While the precalculation of distances can be done based on various criteria depending on the particular form of encoding used, the particular embodiment illustrated measures the distance between different spectra. The distances so measured may be represented by a value between 0 and 255.

As indicated previously, an important aspect of the present invention is the partitioning of the data tokens which constitute the system's vocabulary so that the tokens can be examined by groupings of successively less likely candidates. In accordance with another aspect of the present invention, the partitioning and the selection of partitions for examination during word recognition is performed with a coarser or less precise data structure than that which is required for final evaluation of candidate tokens. For example, the sequence of data frames which fairly precisely represents each token or unknown word to be identified may appropriately contain about 75 data frames or spectra. The actual number of frames in each token or word will depend upon the nominal length of the spoken word. However, for the initial selection of partitions and for the establishing of the partitions themselves, it has been found that a sequence of only 16 frames provides an effective presorting criteria which does not appreciably degrade the accuracy of the final matching procedure which is then performed on a greatly reduced group of candidates. The coarse resolution sequence may be obtained by taking the first and last frames in the detailed sequence together with an equally spaced selection of frames between the first and last of the more detailed representation.

Figure 2A:
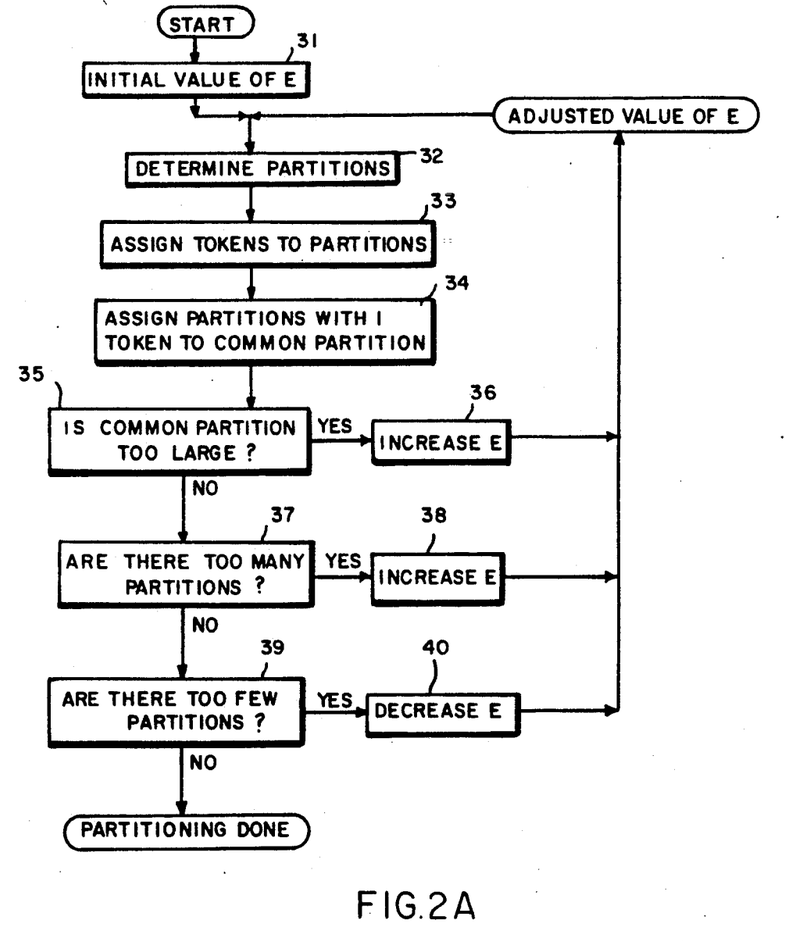
FIGS. 2A-2C taken together are a flow chart illustrating a system for partitioning a collection of data tokens in accordance with the present invention.
Figure 2B:
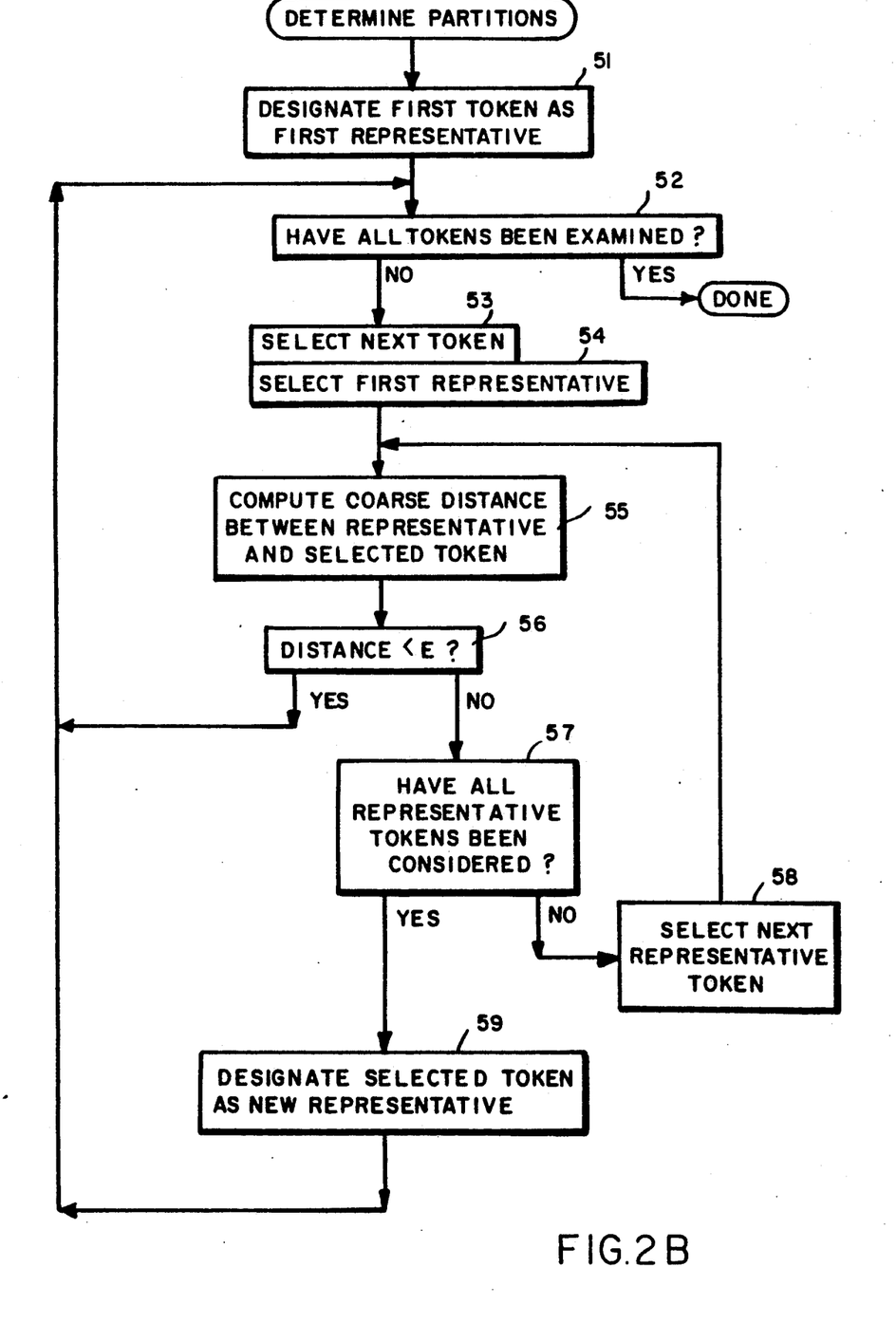
Figure 2C:
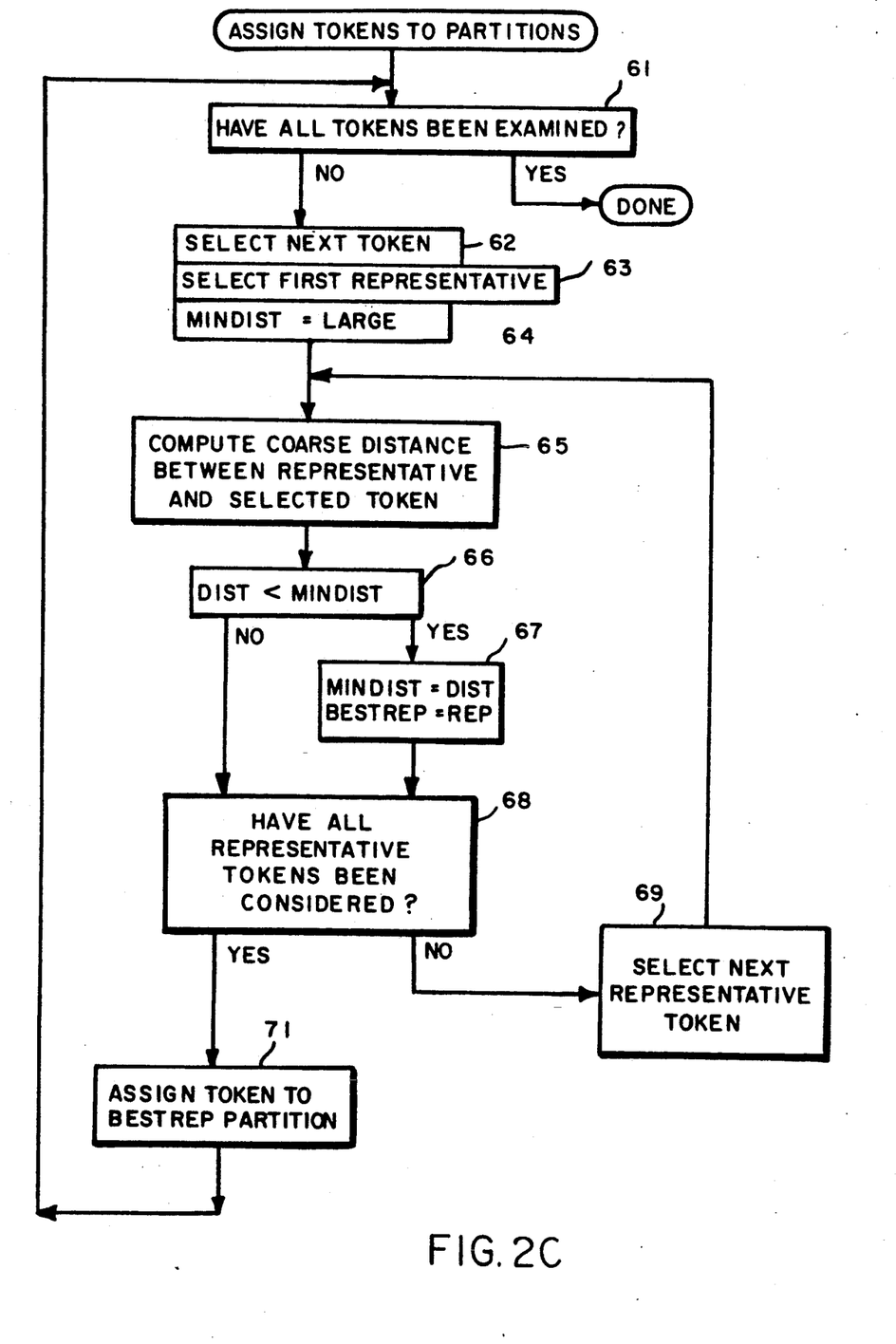

The method of partitioning the collection of data tokens generated during the training phase is illustrated in FIGS. 2A–2C. As indicated previously, it is a function of this operation to partition the collection into groups of tokens having some similarity, with each partition being identified or characterized by a representative one of the tokens in the partition. Tokens are considered to be similar in this context if each is within a preselected vector distance of the representative token for the respective partition. The preselected vector distance is conveniently designated Epsilon or E in various parts of this description and in the program example appended to this description. Initially, the value for Epsilon is chosen essentially arbitrarily, based upon experience with the particular implementation employed. However, as is explained in greater detail hereinafter, the value selected for Epsilon may be changed upon successive iterations of the partitioning procedure, if various criteria are not satisfactorily met.

The overall system for the partitioning of tokens is illustrated in FIG. 2A while details of the procedures for defining partitions and assigning tokens to those partitions are illustrated in FIGS. 2B and 2C respectively. Once an initial value for Epsilon is chosen as indicated at block 31, the system begins to sequentially examine tokens in the collection to define appropriate partitions as indicated at block 32. As will be understood, the first token in the collection will become the first representative as indicated at block 51 in FIG. 2B. The computer then determines, for each token in turn, whether that token is within the preselected distance Epsilon of any existing representative token. The distance measurement step is indicated at block 55 and the comparison step at block 56. The testing for comparison with all representative tokens is indicated at block 57. If a token being examined is not with E of any previously identified representative token, it is identified or marked as a new representative token and the procedure moves on to the next token in the collection.

Once the complete collection has been scanned to identify appropriately dispersed representative tokens, a second pass is initiated to assign all tokens to a partition. This second pass is designated by block 33 in FIG. 2A. and is illustrated in greater detail in FIG. 2C. As each non-representative token is examined, it is assigned to the partition whose representative is closest to the token being examined, all of the representative tokens being tested. The distance computation step is indicated at block 65 and, at block 66, the computed distance is compared with the smallest distance achieved thus far, this smallest distance being represented by the variable "Min Dist". Min Dist is initially set to the largest possible value as indicated at block 64. If the computed distance is less than Min Dist, the value of Min Dist is updated as indicated at block 67 and the pointer to the closest representative "Best Rep" is updated by being replaced by the pointer to the representative currently being examined ("Rep"). After all the representatives have been examined, the token currently being examined is assigned to the Best Rep partition as indicated at block 71.

For reasonable values of Epsilon, the procedure thus far described will result in the forming of a number of partitions with varying numbers of tokens within each partition. Further, some of the partitions will likely contain only one token, i.e. the representative token.

To reduce calculations during the recognition phase of operation, the partitioning procedure illustrated in FIG. 2A then provides a further operation in which each token which characterizes a partition having only one member (the representative itself) is assigned to a common partition as indicated at block 34, thereby eliminating the singleton partitions. In the particular program example given hereinafter, the common partition is referred to as partition 0. While the embodiment described herein eliminates or merges only partitions which have but a single member, it should be understood that, where very large vocabularies are involved, it may be appropriate to eliminate and merge partitions which have a number of members below a predetermined small value which is greater than one. In performing speech recognition as described hereinafter, the tokens in partition 0 are always examined as possible candidates.

As will be understood by those skilled in the art, the advantages of the partitioning schedule of the present invention will be greatest if the number of partitions is reasonable in relation to the total number of tokens and if no individual partitions are abnormally large. While a apt initial choice for the value Epsilon will typically result in suitable partitioning given a typical vocabulary and normal speaker, it should be understood that exceptions may occur and the procedure illustrated in FIG. 2A provides for performing the previously described steps iteratively with different values of Epsilon if certain criteria are not met.

In particular, if the number of non-common partitions is too great, Epsilon is increased as indicated at block 38 and the partitioning procedure is rerun. Conversely, if the number of partitions is too small, Epsilon is reduced as indicated at block 40 and the partitioning procedure is repeated. Increasing Epsilon will tend to increase the number of tokens in each non-common partition and, correspondingly, will tend to reduce the number of non-common partitions. As will be appreciated, these are conflicting requirements, and thus, on each iteration, the amount by which Epsilon is changed is preferably reduced in a binary search pattern so as to find an acceptable value. However, as will be appreciated by those skilled in the art, there is no guarantee that the desired limits on partition size and number of partitions can be met with any given arbitrary collection of vocabulary tokens and speaker characteristics. As indicated previously, this partitioning procedure is part of an initial or setup operation and will typically be performed prior to starting recognition procedures. To this end, the program preferably sets flags whenever a re-running of the partitioning procedure is initiated, so that the user program can determine what course of action is appropriate and, if desired, interaction with the operator or speaker may be utilized to decide which criteria may be loosened or relaxed in establishing the partitioning.

While too small a value of Epsilon will tend to increase the number of non-common partitions, it can also be seen that a small value will tend to increase the size of the common partition, i.e., by creating a large number of singleton partitions which are then merged into the common partition. To prevent extreme sizes for the common partition, the procedure preferably also includes a test of the size of the common partition as indicated at block 35. If the size exceeds a desired level, the value of Epsilon is increased as indicated at block 36 and the partitioning procedure is rerun.

Figure 3:
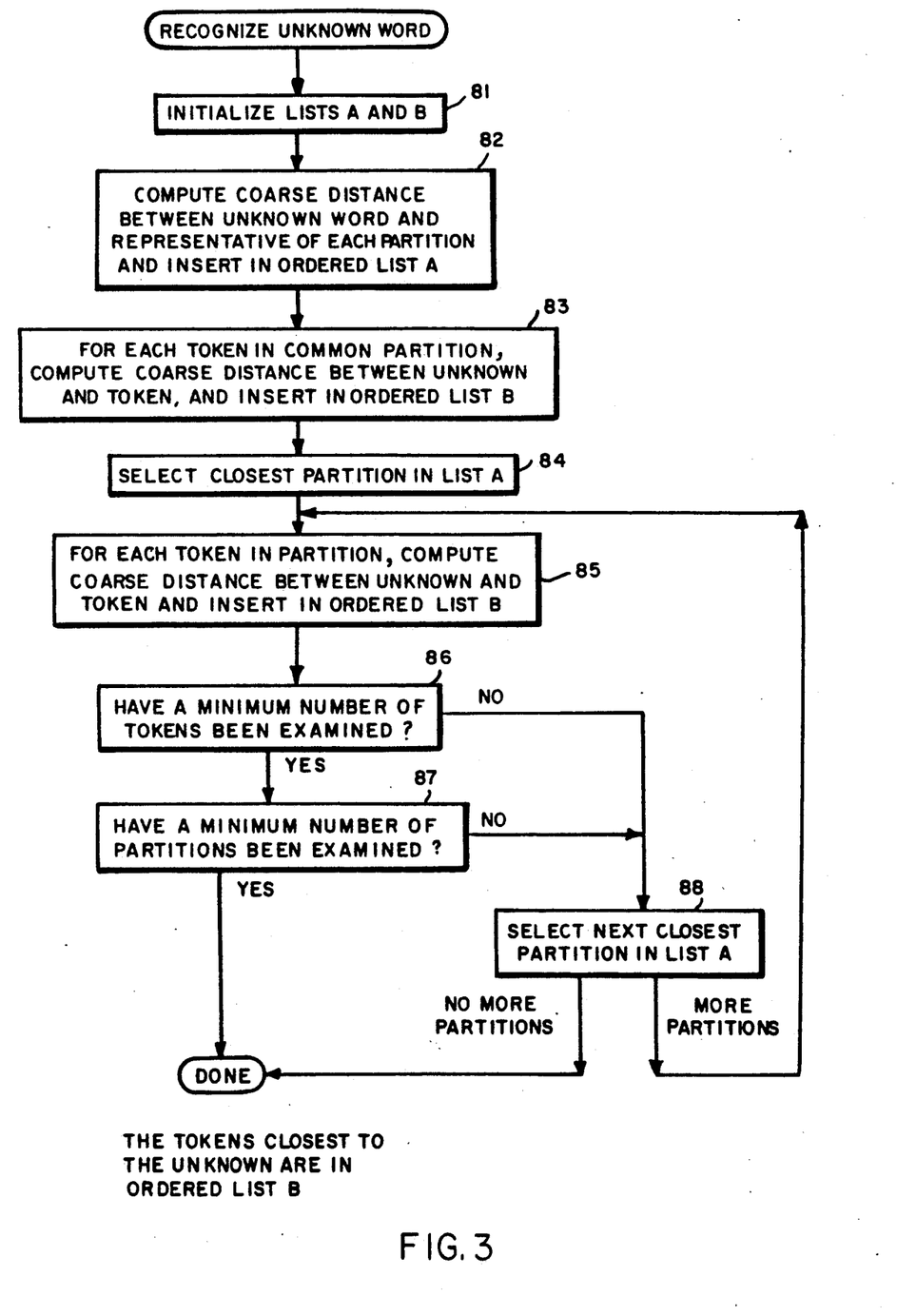
FIG. 3 is a flow chart illustrating a system of selecting data tokens which most closely match an unknown word from a collection of tokens which are assigned to partitions identified by respective representative tokens.

As indicated previously, the purpose of partitioning the data tokens is to facilitate and speed up the recognition process. The presently preferred system for recognizing unknown words utilizing a partitioned collection of data tokens is illustrated in FIG. 3. When an operator speaks an unknown word which is to be recognized, a sequence of samples is taken, spectrum analyzed and converted to a sequence of standard frames just as described previously with respect to the teaching or training phase. Likewise, both fine and coarse or sparse sequences are made available for the subsequent distance calculations.

During the initial selection of candidate tokens from the partitioned collection of tokens, only the coarse or sparse sequence of data frames is utilized so as to substantially reduce the total number of distance calculations required. Initially, a distance value from the unknown to each representative token is calculated and then these distances are sorted and inserted into an ordered list as indicated at block 82. After the sorting, the system examines the common partition as indicated at block 83 and then, starting with the closest partition (block 84), examines successively more distant partitions (block 88). In examining each partition, the system computes, using the sparse data structures, the distance between the unknown and each member of the partition as indicated at block 85.

During the computation, a list of preselected length is maintained which identifies those tokens which have the best scores, i.e., those which are the closest to the unknown. This list is referenced as list B. In the embodiment illustrated, this list is assumed to comprise 64 entries and it is, in effect, updated each time a new token is found which has a better score than the worst score currently in the list. A preferred system for keeping this list is described in greater detail hereinafter. Again, it should be noted that, during this phase, distance calculations are performed using the coarse or sparse sequences of frames so that the calculation proceeds relatively quickly, particularly since the distances between corresponding frames in the unknown and token do not need to be calculated but may be merely extracted from the precalculated table as described previously.

Rather than proceeding through all of the partitions (which would substantially nullify the advantages of partitioning), the system of the present invention terminates the examining of successive partitions after a sufficient number of partitions have been examined and a sufficient number of calculations have been performed to give reasonable assurance that the distances involved no longer correspond to likely candidates. These tests are indicated at blocks 87 and 86 respectively. Again, this is an essentially arbitrary criteria and can be set in correspondence with the overall degree of accuracy and reliability which is necessary for the particular application. In one presently preferred embodiment of the present invention, no new partitions are examined after approximately 1600 coarse scale distance calculations have been performed. With a typical token population, this corresponds to roughly 800 such calculations for ordering the partitions and 800 such calculations for distance calculations with respect to members within the partitions. If the contents of all partitions were examined, the number of vector distance calculations required would be in the order of 16000. It may thus be seen that a substantial saving is implemented.

After the examining of successively more distant partitions has been terminated, the list which was maintained during the examination of partitions will identify 64 candidates from the entire collection of tokens, e.g. 16000 in number. At this point, the unknown word is preferably compared with each of the candidate tokens using the full fine resolution sequence which permits a more detailed comparison. While the individual distance cumulations involved in more precisely determining the distance between the unknown and each of the candidate tokens will take substantially more time than the individual coarse calculations utilized during the partition examining phase, there will be a relatively small number of such more precise calculations to be made. In doing these more precise calculations, it is also advantageous to utilize speed normalization or time warping as it is sometimes referred to, techniques which are known in the art and which are described in greater detail, for example, in U.S. Pat. No. 4,799,262 referred to previously. Similarly, various other computationally intensive scoring techniques may be utilized since the number of candidates has been substantially reduced. Again, it should be understood that the thrust of the present invention is in the expeditious generating of a list of prospective candidates which will then be subject to close scrutiny so that the number of computationally intensive procedures may be held to a minimum while maintaining high overall accuracy and reliability of the system.

Figure 4A:
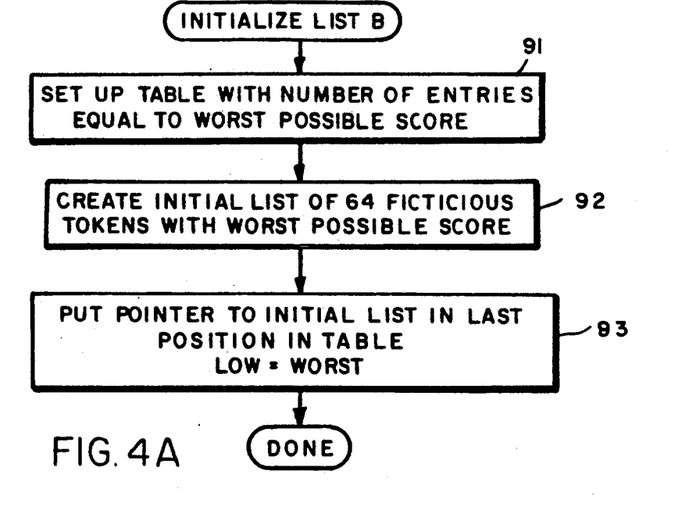
FIGS. 4A and 4B taken together are a flow chart illustrating a system for maintaining a list of candidate tokens useful in the system of FIG. 3.
Figure 4B:
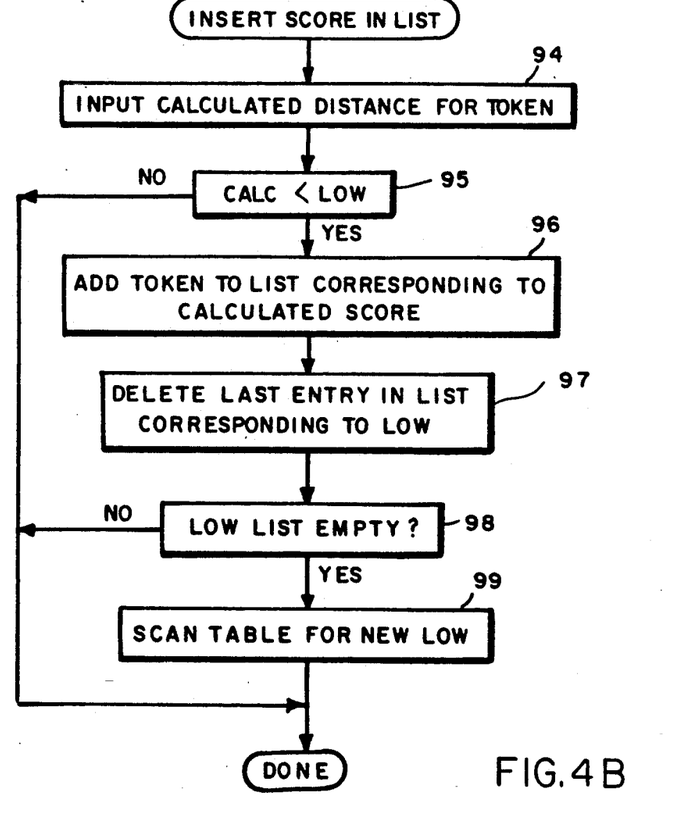

FIGS. 4A and 4B illustrate a preferred system for maintaining a ranked list of the most likely candidates during the examining of the successive partitions, i.e. the list B. As is understood by those skilled in the art, conventional sorting of such a list each time a better scoring candidate was discovered would add substantially to the calculations which need to be performed as the successive partitions are examined.

As indicated previously, the distances between frames or spectra can be represented as a value between zero and 255. The cumulative distance between an unknown and a token using the coarse data will thus always be less than 4096. Rather than repeatedly sorting a 64-element list, the system of FIG. 4 maintains a table with 4096 entries, there being a possible entry for every possible distance value. This is indicated at block 91. In other words, each position in the table corresponds to a distance from the unknown word. Each entry in the table can contain a pointer to a linked list of the tokens whose scores, i.e. distance from the unknown, corresponds to that position within the table.

Prior to examining the successive partitions, the table is initialized by inserting a pointer in the last position of the table which points to a linked list of 64 fictitious tokens all having the worst possible score. This is indicated at blocks 92 and 93 In general, these steps comprise the initializing of List B as described with reference to FIG. 3 block 81.

As the examining of successive partitions proceeds and the scores for successive tokens are calculated, each new score is compared with the lowest active entry in the table as indicated at blocks 94 and 95. If it is better, i.e. if it represents a shorter distance, one entry is removed from the linked list corresponding to that lowest active score as indicated at block 96 and the new candidate is added to the list at the point in the table which corresponds to its own score as indicated at block 97. The value of the lowest active score is stored as a variable and needs to be changed only if the list corresponding to that value is emptied as indicated at block 98, i.e. if all entries at that score level have been replaced by better scoring entries. Further, since only 64 entries at most can be occupied in the table at any given time, even if there are no duplicate scores, it will be understood that the table will be sparsely populated and can be quickly scanned from the bottom up to determine the worst score on the list, i.e. as indicated at block 99. Thus, a relatively fast computer operation is obtained with little time consuming looping. In general, the steps of FIG. 4B correspond to the process of inserting a token into the ordered list B as indicated in block 85 of FIG. 3.

As will be understood by those skilled in the art, the detailed structure of a computer program to implement the systems disclosed in the flow charts of FIGS. 2-4 might take many forms depending on many variables which are not inherent parts of the present invention, e.g. the form of coding used, the particular processor employed, and the programming language. However, by way of example, Appendix A contains a particular example of such a program written in the C programming language This particular program may, for example, be converted to executable code by the High C compiler available from Metaware of Santa Cruz, Calif.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a large vocabulary speech recognition system, a method of partitioning a collection of data tokens which represent the system's entire vocabulary and of identifying tokens to be representative of each partition to facilitate the subsequent selection of tokens which most closely match a spoken word which is to be recognized, said method comprising:

examining said tokens sequentially and, for each token, determining if said token matches any previously identified representative within a preselected tolerance and, if it does not, identifying said token as a new representative; and assigning each token which is not identified as a representative token to a partition corresponding to a representative token which is within said preselected tolerance irrespective of whether the non-representative token corresponds to a different vocabulary word than the representative token thereby to form partitions encompassing different vocabulary words.

2. The method according to claim 1 further comprising the step of determining the number of partitions created and, if the number of partitions created exceeds a selected value, increasing said preselected tolerance and repeating the procedures of claim 1.

3. The method according to claim 1 further comprising the step of examining all partitions created and, for partitions containing fewer than a preselected number of tokens, deleting those partitions and assigning the tokens which were in those deleted partitions to a common partition.

4. The method according to claim 1 further comprising the step of examining all partitions created and, for partitions containing no tokens other than a representative token, deleting those partitions and assigning the tokens which were in those deleted partitions to a common partition.

5. In a large vocabulary speech recognition system, a method of selecting those data tokens which most closely match an unknown spoken word from a collection of tokens which are assigned to a plurality of partitions, the various partitions being characterized by respective representative tokens, all tokens and the unknown spoken word being characterized by both a coarse sequence of vectors and a fine sequence of vectors, said method comprising:

using only the respective coarse sequences of vectors determining a coarse vector distance between the unknown spoken word and each representative;

starting with the nearest and proceeding through successively more distant representatives as measured by the respective said coarse vector distances, examining the tokens within the respective partition and, using only the respective coarse sequences of vectors, determining a coarse vector distance between the unknown and each token within said respective partition while maintaining a list of preselected size identifying those examined tokens which are least distant from the unknown as measured by the respective said coarse vector distances, said examining being continued until the number of distance determinations reaches a preselected level; and using the respective fine sequences of vectors, determining a fine vector distance between the unknown and each token identified in said list thereby to enable the tokens in said list to be ranked on the basis of the respective fine vector distances for output from the system.

6. The method of claim 5 wherein said distance calculations are performed according to a numerical system providing a maximum possible distance and wherein the tokens comprising said list are identified by pointers contained in a table having entries corresponding in number to the value of the maximum possible distance between an unknown and any 7. In a large vocabulary speech recognition system, a method of partitioning a collection of data tokens which represent the system's entire vocabulary and of subsequently selecting tokens which most closely match an unknown spoken word which is to be recognized, said method comprising:

examining said tokens sequentially and, for each token, determining if said token matches any previously identified representative within a preselected tolerance and, if it does not, identifying said token as a new representative; assigning each token which is not identified as a representative token to a partition corresponding to a representative token which is within said preselected tolerance irrespective of whether the non-representative token corresponds to a different vocabulary word than the representative token thereby to form partitions encompassing different vocabulary words;

computing the distance between the unknown spoken word and each representative; and starting with the nearest representative and proceeding through successively more distance representatives, computing the distance between the unknown spoken word and each token within the respective partition until the number of distance computations reaches a preselected value, thereby to identify a number of tokens to be output together with respective distance measurements enabling the identified tokens to be ranked as to closeness of match with said unknown spoken word.

8. The method according to claim 7 further comprising the step of determining the number of partitions created and, if the number of partitions created exceeds a selected value, increasing said preselected tolerance and repeating the procedures of claim 7.

9. The method according to claim 7 further comprising the step of examining all partitions created and, for partitions containing fewer than a preselected number of tokens, deleting those partitions and assigning the tokens which were in those deleted partitions to a common partition.

10. The method of claim 7 further comprising maintaining a list of preselected size containing the tokens which are least distance from the unknown.

11. In a large vocabulary speech recognition system, a method of partitioning a collection of data tokens which represent the system's entire vocabulary and subsequently selecting tokens which most closely match an unknown spoken word which is to be recognized, said method comprising:

for each token in sequence, determining if said token matches any previously identified representative within a preselected tolerance and, if it does not, identifying said token as a new representative;

assigning each token which is not identified as a representative token to a partition corresponding to a representative token which is within said preselected tolerance irrespective of whether the non-representative token corresponds to a different vocabulary word than the respective token thereby to form partitions encompassing different vocabulary words;

combining all partitions which contain no tokens other than a representative token into a common partition;

computing the distance between the unknown spoken word and each token in the common partition;

computing the distance between the unknown and each representative; and starting with the nearest representative as determined by the ranking of the respective computed distances and proceeding through successively more distance representative, computing the distance between the unknown spoken word and each token within the respective partition until the number of distance computations reaches a preselected value thereby to identify a number of tokens to be output together with respective distance measurements enabling the identified tokens to be ranked as to closeness of match with said unknown spoken word.

12. In a large vocabulary speech recognition system, a method of selecting those data tokens which most closely match an unknown spoken word from a collection of tokens which are assigned to a plurality of partitions including a common partition and a group of other partitions which are characterized by respective representative tokens and which can encompass tokens corresponding to different vocabulary words, said method comprising:

computing the distance between the unknown spoken word and each token in the common partition;

computing the distance between the unknown spoken word and each representative; and starting with the nearest representative as determined by the ranking of the respective computed distances and proceeding through successively more distant representative, computing the distance between the unknown spoken word and each token within the respective partition until the number of distance computations reaches a preselected value thereby to identify a number of tokens to be output together with respective distance measurements enabling the identified tokens to be ranked as to closeness of match with said unknown spoken word.

13. The method of claim 12 further comprising maintaining a list of preselected size containing the tokens which are least distant from the unknown thereby to limit the number of distances which must be ranked.

14. In a speech recognition system, a method of selecting from a collection of data tokens those tokens which most closely represent an unknown spoken word according to a numeric vector distance calculation which provides a predetermined number of distance values, said method comprising:

initializing a table having ordered entries corresponding in number to the values of the possible distances between an unknown spoken word and any token, each entry being active when it contains a pointer to a linked list of tokens;

placing in the last entry in said table a pointer to a linked list of selected length;

computing the distance between the unknown spoken word and a succession of candidate tokens;

for each computed distance which is less than that corresponding to the lowest active entry in said table, deleting an element from the linked list corresponding to the lowest active entry and inserting a linked list element corresponding to the computed distance, whereby, after the succession of candidate tokens is scanned, the entries in the table will identify those candidate tokens which are closest to the unknown, the number of thereby identified candidate tokens being equal to said selected length.

* * * * *